(12) United States Patent
Chen

(10) Patent No.: US 8,141,951 B2
(45) Date of Patent: Mar. 27, 2012

(54) CHILD SAFETY SEAT

(75) Inventor: Ying-Zhong Chen, Taipei (TW)

(73) Assignee: Excellerate Enterprise Co., Ltd., Songshan District, Taipei (TW)

( * ) Notice: Subject to any disclaimer, the term of this patent is extended or adjusted under 35 U.S.C. 154(b) by 366 days.

(21) Appl. No.: 12/555,814

(22) Filed: Sep. 9, 2009

(65) Prior Publication Data

US 2010/0060055 A1 Mar. 11, 2010

Related U.S. Application Data

(60) Provisional application No. 61/095,630, filed on Sep. 10, 2008.

(51) Int. Cl.
*A47D 1/10* (2006.01)

(52) U.S. Cl. ............ 297/256.11; 297/353; 297/256.13

(58) Field of Classification Search ........... 297/256.11, 297/256.13, 353
See application file for complete search history.

(56) References Cited

U.S. PATENT DOCUMENTS

| | | | |
|---|---|---|---|
| 4,660,885 A | 4/1987 | Suhr | |
| 5,098,157 A | 3/1992 | Surot | |
| 5,645,317 A | 7/1997 | Onishi | |
| 5,890,762 A | 4/1999 | Yoshida | |
| 6,478,377 B2 | 11/2002 | Kassai | |
| 6,746,080 B2 | 6/2004 | Tsugimatsu | |
| 6,811,216 B2 | 11/2004 | Sedlack | |
| 6,834,915 B2 | 12/2004 | Sedlack | |
| 7,055,903 B2 * | 6/2006 | Balensiefer et al. ..... 297/256.11 |
| 7,059,677 B2 | 6/2006 | Balensiefer | |
| 7,073,859 B1 | 7/2006 | Wilson | |
| 7,207,628 B2 | 4/2007 | Eros | |
| 7,246,852 B2 | 7/2007 | Balensiefer | |
| 7,370,912 B2 * | 5/2008 | Williams et al. ......... 297/256.11 |
| 7,452,031 B2 * | 11/2008 | Woellert et al. ...... 297/256.11 X |
| 7,547,066 B2 | 6/2009 | Mendenhall | |
| 7,625,043 B2 * | 12/2009 | Hartenstine et al. . 297/256.13 X |
| 7,901,003 B2 | 3/2011 | Meeker | |
| 7,954,895 B2 | 6/2011 | Freeman | |
| 2002/0043837 A1 | 4/2002 | Kain | |
| 2004/0189068 A1 | 9/2004 | Meeker | |
| 2007/0057545 A1 | 3/2007 | Hartenstine | |
| 2007/0120403 A1 | 5/2007 | Drexler | |
| 2008/0018152 A1 | 1/2008 | Vadai | |

FOREIGN PATENT DOCUMENTS

| | | |
|---|---|---|
| CN | 201161560 Y | 12/2008 |
| EP | 0 631 903 A1 | 1/1995 |
| EP | 1 033 280 A2 | 9/2000 |
| EP | 1 122 120 A1 | 8/2001 |
| EP | 1 033 280 A3 | 11/2002 |
| EP | 1 621 395 A2 | 2/2006 |
| EP | 1 621 395 A3 | 4/2009 |
| GB | 2 444 834 A | 6/2008 |

* cited by examiner

*Primary Examiner* — Anthony D Barfield
(74) *Attorney, Agent, or Firm* — Winston Hsu; Scott Margo

(57) ABSTRACT

A child safety seat includes a seat body, an engaging board, a backrest, and an engaging mechanism. The engaging board is connected to the seat body. A tooth-shaped structure is formed on the engaging board. The backrest is movably disposed on the engaging board. The engaging mechanism is disposed between the engaging board and the backrest. The engaging mechanism includes an engaging member and a driving device. The engaging member is pivotally connected to the backrest for engaging with the tooth-shaped structure. The driving device is pivotally connected to the engaging member and movably connected to the backrest. When the driving device moves between a locking position and a releasing position relative to the backrest, the driving device drives the engaging member to rotate relative to the backrest.

13 Claims, 8 Drawing Sheets

CHILD SAFETY SEAT

CROSS REFERENCE TO RELATED APPLICATIONS

This application claims the benefit of U.S. Provisional Application No. 61/095,630, which was filed on Sep. 10, 2008, and is incorporated herein by reference.

BACKGROUND OF THE INVENTION

1. Field of the Invention

The invention relates to a child safety seat, and more particularly, to a child safety seat equipped with a mechanism for adjusting height of backrest.

2. Description of the Prior Art

In general, to ensure safety of a child while traveling in car, many countries have legislated there has to be a child safety seat installed in the car for securing the child. To absorb impact force during an automobile accident, the safety design of the child safety seat is always complicated. However, besides the structural design for safety issue, people do not pay much attention to auxiliary design for purpose of adjusting requirement based on different children. For example, a height adjusting mechanism can be used to adjust height of backrest based on different children with different heights. Although a conventional height adjusting mechanism can be used to adjust height of backrest within a specific range, there are still some problems, such as the structural design is complicated or the operation is inconvenient.

SUMMARY OF THE INVENTION

Therefore, an objective of the invention is to provide a child safety seat equipped with a mechanism for adjusting height of backrest, so as to solve the aforesaid problems.

According to one embodiment, a child safety seat of the invention comprises a seat body, an engaging board, a backrest and an engaging mechanism. The engaging board is connected to the seat body and a tooth-shaped structure is formed on the engaging board. The backrest is movably disposed on the engaging board. The engaging mechanism is disposed between the engaging board and the backrest. The engaging mechanism comprises an engaging member and a driving device. The engaging member is pivotally connected to the backrest for engaging with the tooth-shaped structure. The driving device is pivotally connected to the engaging member and movably connected to the backrest. The driving device drives the engaging member to rotate relative to the backrest when moving between a locking position and a releasing position relative to the backrest.

According to the aforesaid embodiment of the invention, the child safety seat utilizes the aforesaid driving device to engage/disengage the engaging member with/from the tooth-shaped structure of the engaging board, so as to enable the backrest to move relative to the engaging board upwardly and downwardly or fix at specific height relative to the engaging board. Accordingly, through simple design of engaging mechanism, the invention not only simplifies the structure of height adjusting mechanism but also reduces the manufacture cost. Furthermore, a user can easily adjust height of the backrest relative to the engaging board through simple operation, so as to greatly enhance the convenience while using the child safety seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
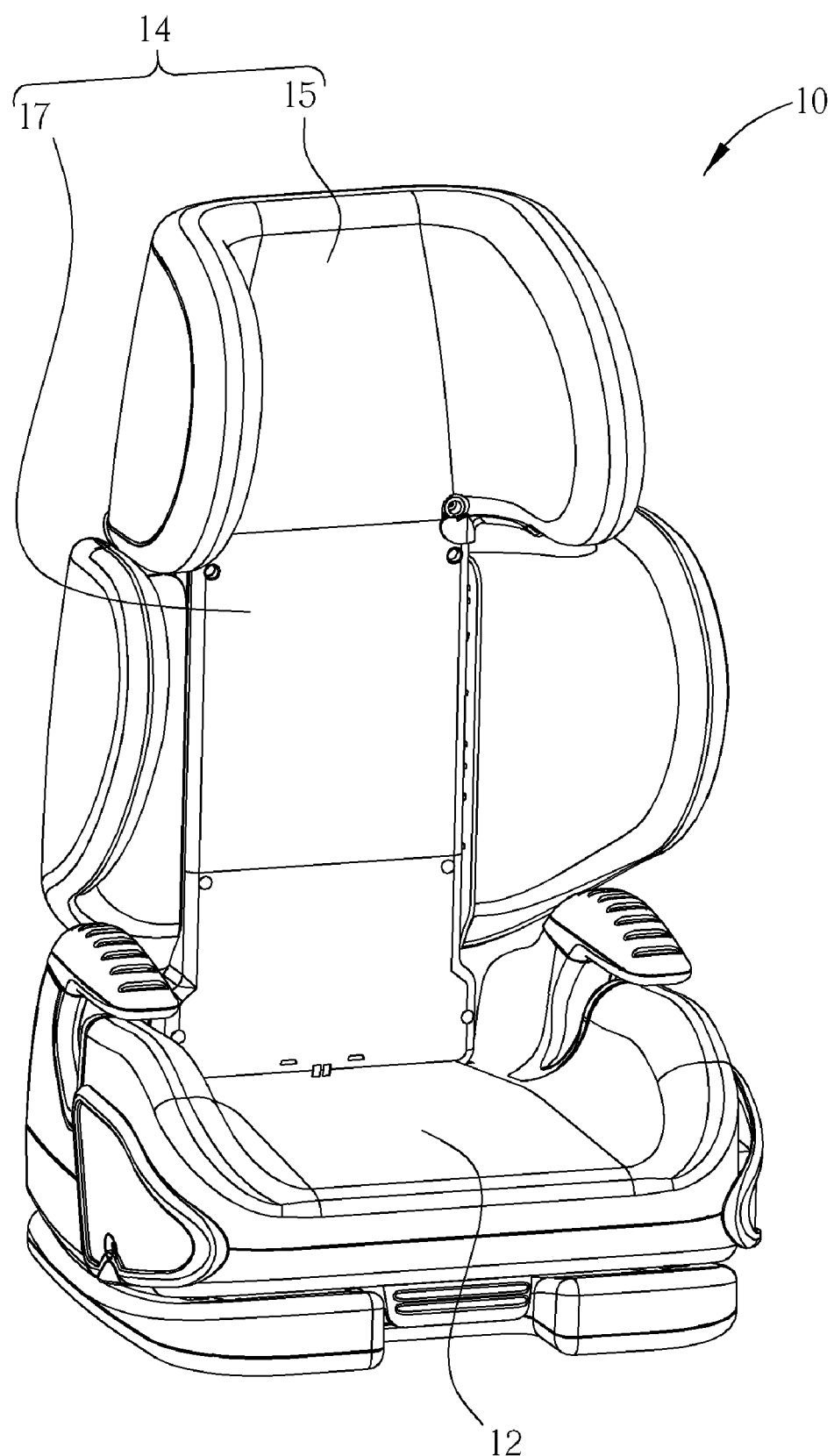
FIG. 1 is a schematic diagram illustrating a child safety seat according to one embodiment of the invention.
Figure 2:
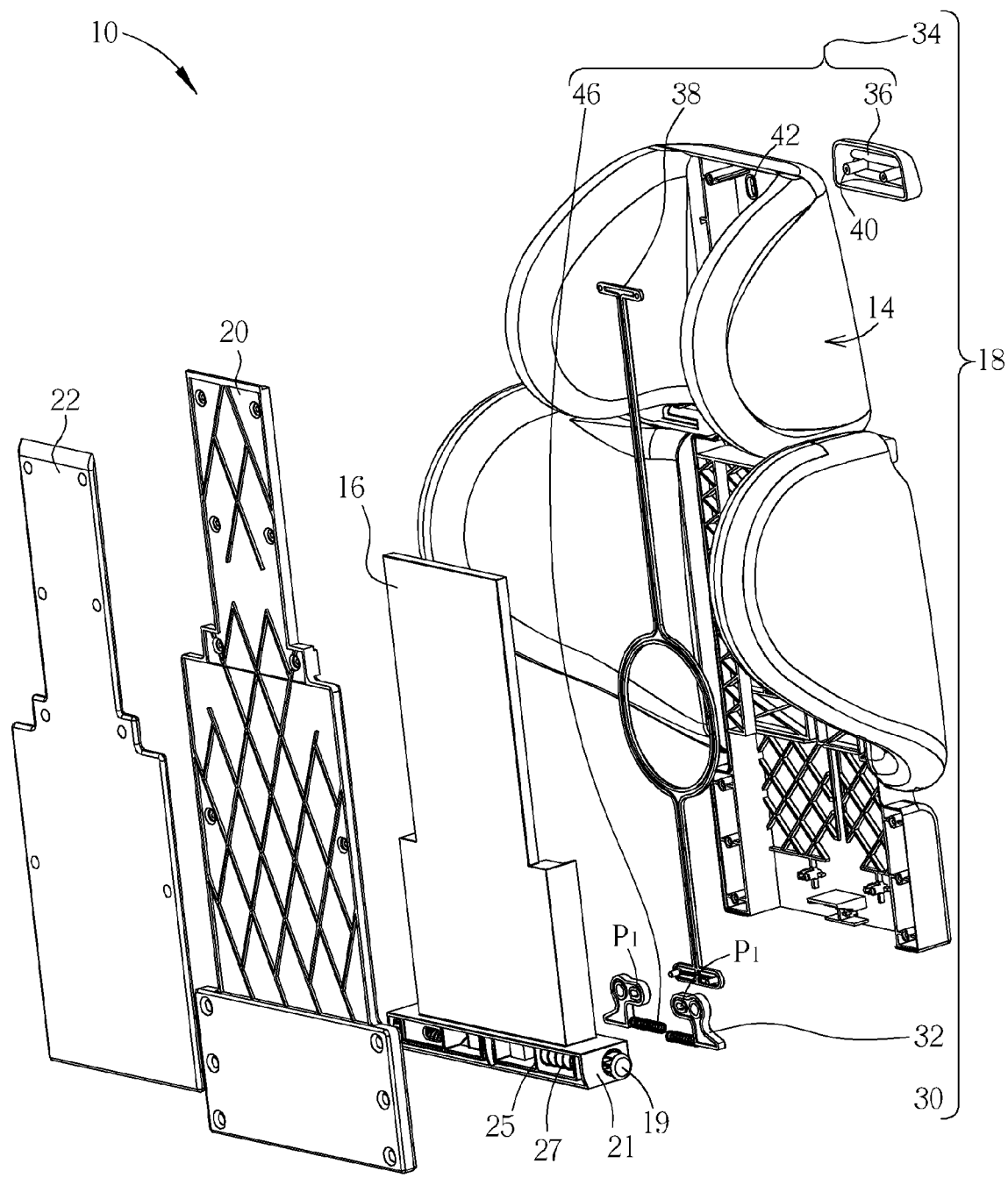
FIG. 2 is an exploded view illustrating parts of the child safety seat shown in FIG. 1.
Figure 3:
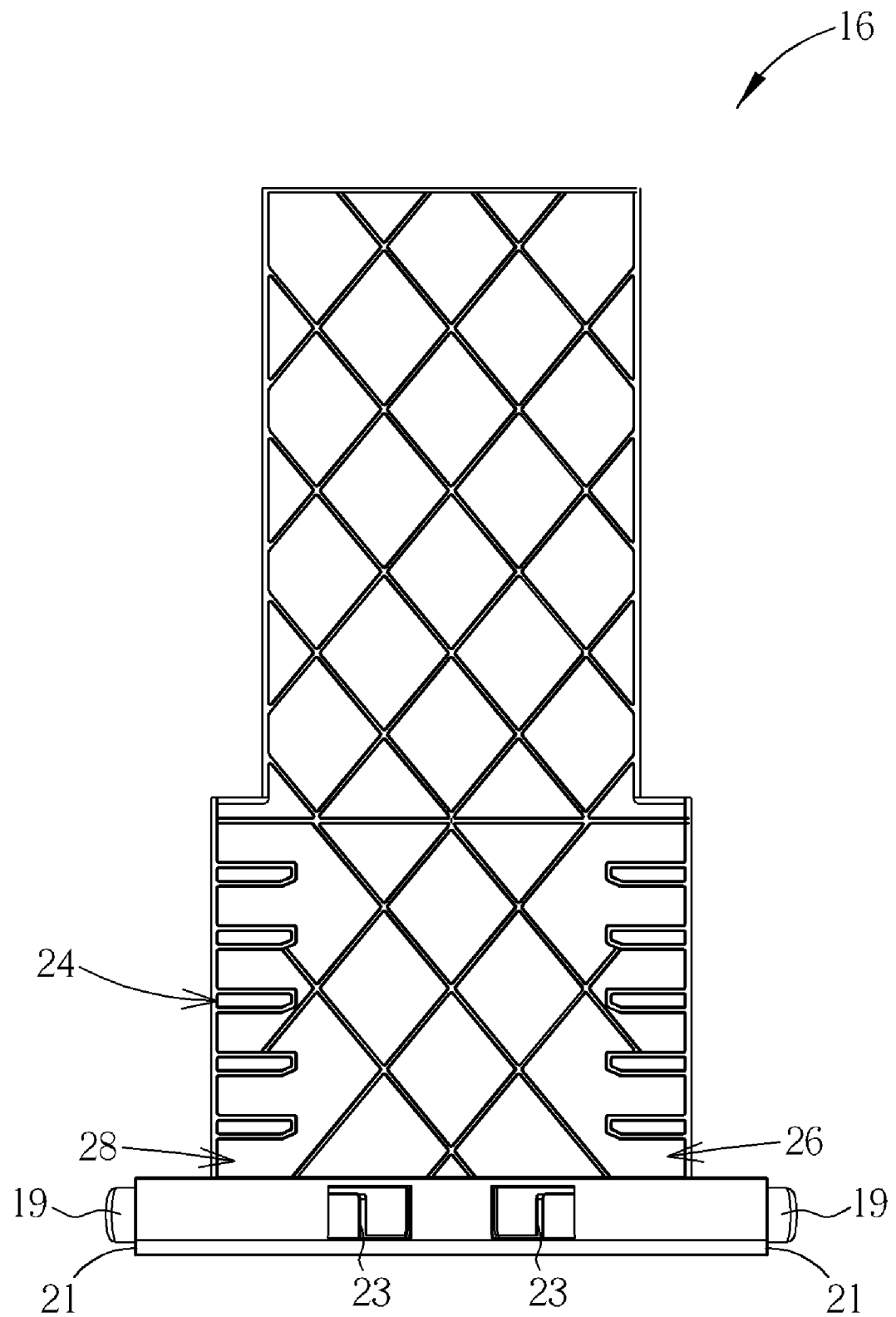
FIG. 3 is a rear view illustrating the engaging board shown in FIG. 2.

Referring to FIGS. 1 and 2, FIG. 1 is a schematic diagram illustrating a child safety seat 10 according to one embodiment of the invention, and FIG. 2 is an exploded view illustrating parts of the child safety seat 10 shown in FIG. 1. As show in FIG. 1, the child safety seat 10 comprises a seat body 12 and a backrest 14. The seat body 12 may comprise some components, such as seat pad, handrail, and so on, disposed on a common child safety seat. As shown in FIG. 2, the child safety seat can further comprise an engaging board 16, an engaging mechanism 18, a backrest cover 20 and a protecting pad 22. The backrest 14 is movably disposed on the engaging board 16 and used for supporting the back of a child secured on the child safety seat 10. That is to say, the child can lie on or lean against the backrest 14. The backrest 14 comprises a headrest portion 15 and a body portion 17. The headrest portion 15 is connected to the body portion 17 closely and formed integrally and movable synchronously with the body portion 17, wherein the headrest portion 15 is used for supporting the head of a child and the body portion 17 is used for supporting the body of a child individually. The engaging board 16 is connected to the seat body 12. The engaging board 16 is shown in FIG. 3. FIG. 3 is a rear view illustrating the engaging board 16 shown in FIG. 2.

Figure 4:
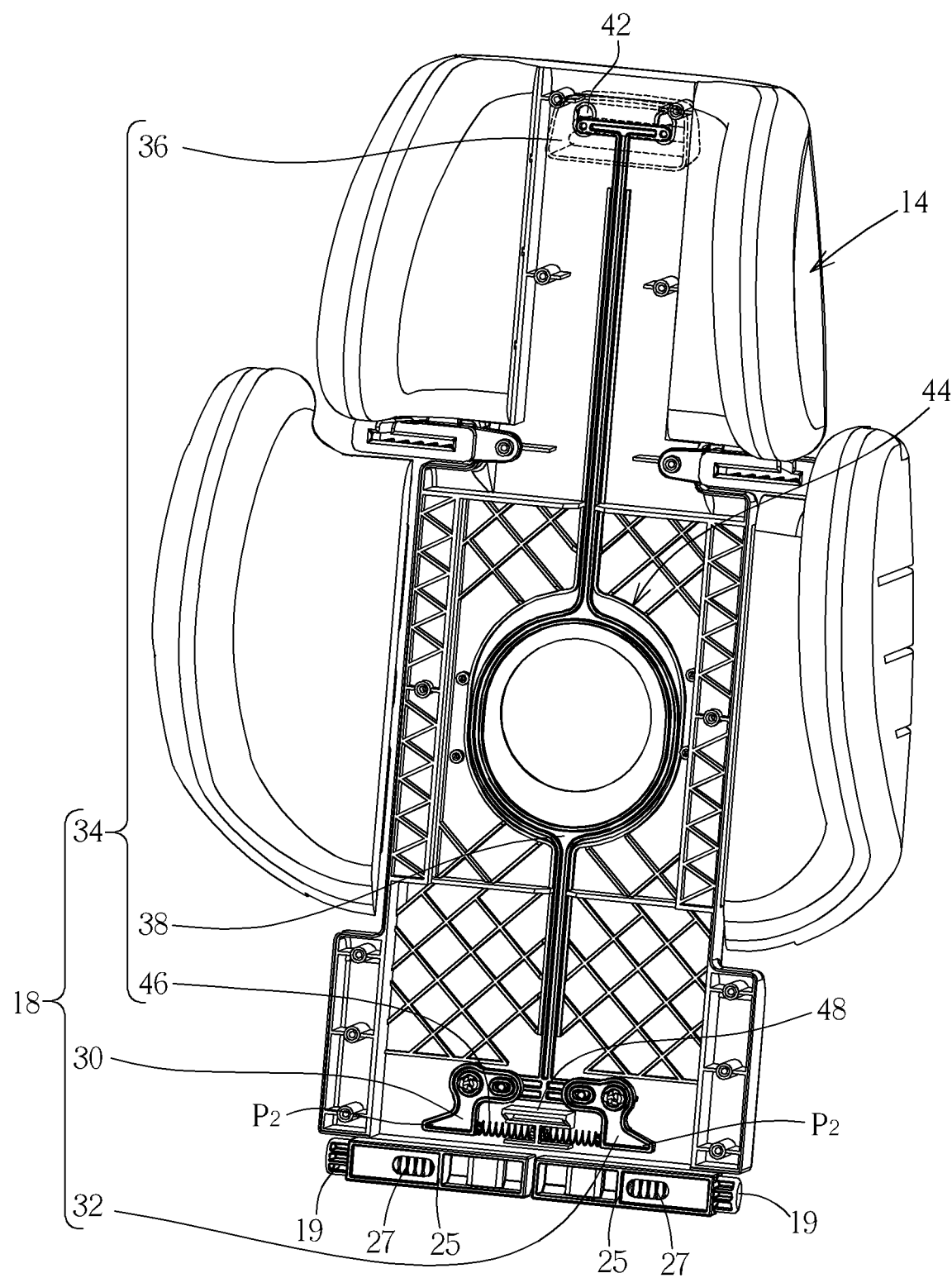
FIG. 4 is a schematic diagram illustrating the engaging mechanism, which is shown in FIG. 2, disposed on the backrest.

As show in FIG. 2, a protruding shaft 19 extends outwardly from one side 21 of the engaging board 16. The protruding shaft 19 of the engaging board 16 can be connected to a concave hole (not shown) of the seat body 12. Accordingly, the engaging board 16 is pivotable by the protruding shaft 19 relative to the seat body 12, so as to adjust the tilt angle of the engaging board 16. Furthermore, as shown in FIGS. 3 and 4, FIG. 4 is a schematic diagram illustrating the engaging mechanism 18, which is shown in FIG. 2, disposed on the backrest 14. There is a press portion formed on one end of the protruding shaft 19, wherein the press portion is away from the side 21 of the engaging board 16. The engaging board 16 has a partition 25 to make a room at the bottom for receiving one part of the protruding shaft 19 and a resilient member 27 which is disposed between the other end of the protruding shaft 19 and the partition 25. As shown in FIG. 3, a tooth-shaped structure 24 is formed on the engaging board 16 and comprises a plurality of first positioning grooves 26 and a plurality of second positioning grooves 28. FIG. 3 shows six first positioning grooves 26 and six second positioning grooves 28.

The engaging mechanism 18 is disposed between the engaging board 16 and the backrest 14. As shown in FIG. 2, the engaging mechanism 18 comprises a first engaging member 30, a second engaging member 32 and a driving device 34. The first engaging member 30 is pivotally connected to the backrest 14 and used for engaging with one of the first positioning grooves 26 of the tooth-shaped structure 24. The second engaging member 32 is also pivotally connected to the backrest 14 and used for engaging with one of the second positioning grooves 28 of the tooth-shaped structure 24. The driving device 34 is movably connected to the backrest 14 and comprises a pulling member 36 and a connecting member 38. In this embodiment, the pulling member 36 can be a handle. The connecting member 38 is connected to the pulling member 36 and pivotally connected to a first end P1 of the first engaging member 30 and a first end P1 of the second engaging member 32. The pulling 36 can drive the first end P1 of the first engaging member 30 and the first end P1 of the second engaging member 32 to rotate relative to the backrest 14 when the driving device 34 moves relative to the backrest 14. The backrest cover 20 is disposed on one side of the engaging board 16 and used for covering the engaging board 16 and the engaging mechanism 18, so as to achieve additional protection effect. The protecting pad 22 is disposed on the backrest cover 20. In this embodiment, the protecting pad 22 can be made of expandable polystyrene (EPS). It should be noted that the protecting pad 22 also can be made of other soft material for absorbing impact force. In other words, since the protecting pad 22 can absorb impact force during an automobile accident, the child secured on the child safety seat 10 can be protected well.

Moreover, as shown in FIG. 2, the pulling member 36 comprises at least one pillar 40 (two pillars are shown in FIG. 2) The pillar 40 can be received in a restraining hole 42 of the backrest 14 and used to restrain the moving range of the pulling member 36 relative to the backrest 14. For example, the pulling member 36 can only move in one limited direction relative to the backrest 14 due to the restraining hole 42. In this embodiment, the headrest portion 15 and the body portion 17 are formed integrally, so that the headrest portion 15 and the body portion 17 can move relative to the engaging board 16 simultaneously.

Referring to FIGS. 3 and 4, an accommodating space 44 is formed on the backrest 14. As shown in FIG. 4, the accommodating space 44 is used to accommodate the connecting member 38, such that the connecting member 38 can move upwardly and downwardly within the accommodating space 44. Furthermore, the driving device 34 further comprises a spring 46 connected to between the first engaging member 30 and a protruding portion 48 of the backrest 14. The spring 46 is used to provide an elastic force for the first engaging member 30, so as to position a second end P2 of the first engaging member 30 in one of the first positioning grooves 26 of the tooth-shaped structure 24. As to the second engaging member 32, as shown in FIG. 4, the aforesaid manner also can be adapted to the second engaging member 32. That is to say, the spring 46 also can be connected between the second engaging member 32 and the protruding portion 48 of the backrest 14 and used to provide an elastic force for the second engaging member 32, so as to position a second end P2 of the second engaging member 32 in one of the second positioning grooves 28 of the tooth-shaped structure 24.

Figure 5:
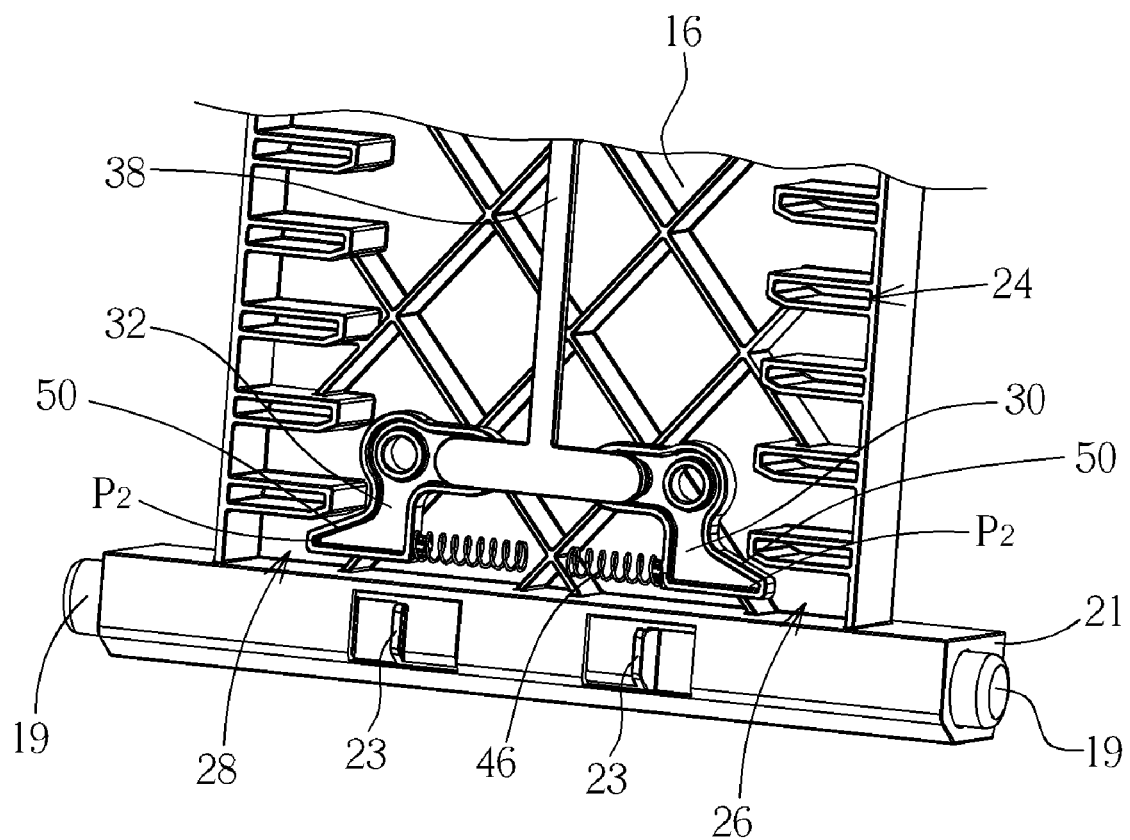
FIG. 5 is an enlarged view illustrating the first and second engaging members, which are shown in FIG. 2, engaged with the tooth-shaped structure.

In the following, the structure and principle of the backrest 14, the engaging board 16 and the engaging mechanism 18 will be depicted in detail. Referring to FIGS. 4 and 5, FIG. 5 is an enlarged view illustrating the first and second engaging members 30 and 32, which are shown in FIG. 2, engaged with the tooth-shaped structure 24. When the driving device 34 is located at a locking position (shown in FIG. 4) relative to the backrest 14 and the backrest 14 is located at a height (shown in FIG. 1) relative to the engaging board 16, the second end P2 of the first engaging member 30 and the second end P2 of the second engaging member 32 are respectively engaged with the first positioning groove 26 and the second positioning groove 28 of the tooth-shaped structure 24. Furthermore, the springs 46, which are respectively disposed between the first engaging member 30 and the protruding portion 48 and between the second engaging member 32 and the protruding portion 48, can provide elastic force for the first and second engaging members 30 and 32, so as to respectively position the second end P2 of the first engaging member 30 and the second end P2 of the second engaging member 32 in the first and second positioning grooves 26 and 28. Consequently, the backrest 14 of the child safety seat 10 can be fixed at a desired height (shown in FIG. 1) relative to the engaging board 16 due to the engagement between the second end P2 of the first engaging member 30 and the first positioning groove 26 and the engagement between the second end P2 of the second engaging member 32 and the second positioning groove 28. Accordingly, the child can lie on or lean against the backrest 14 comfortably.

Figure 6:
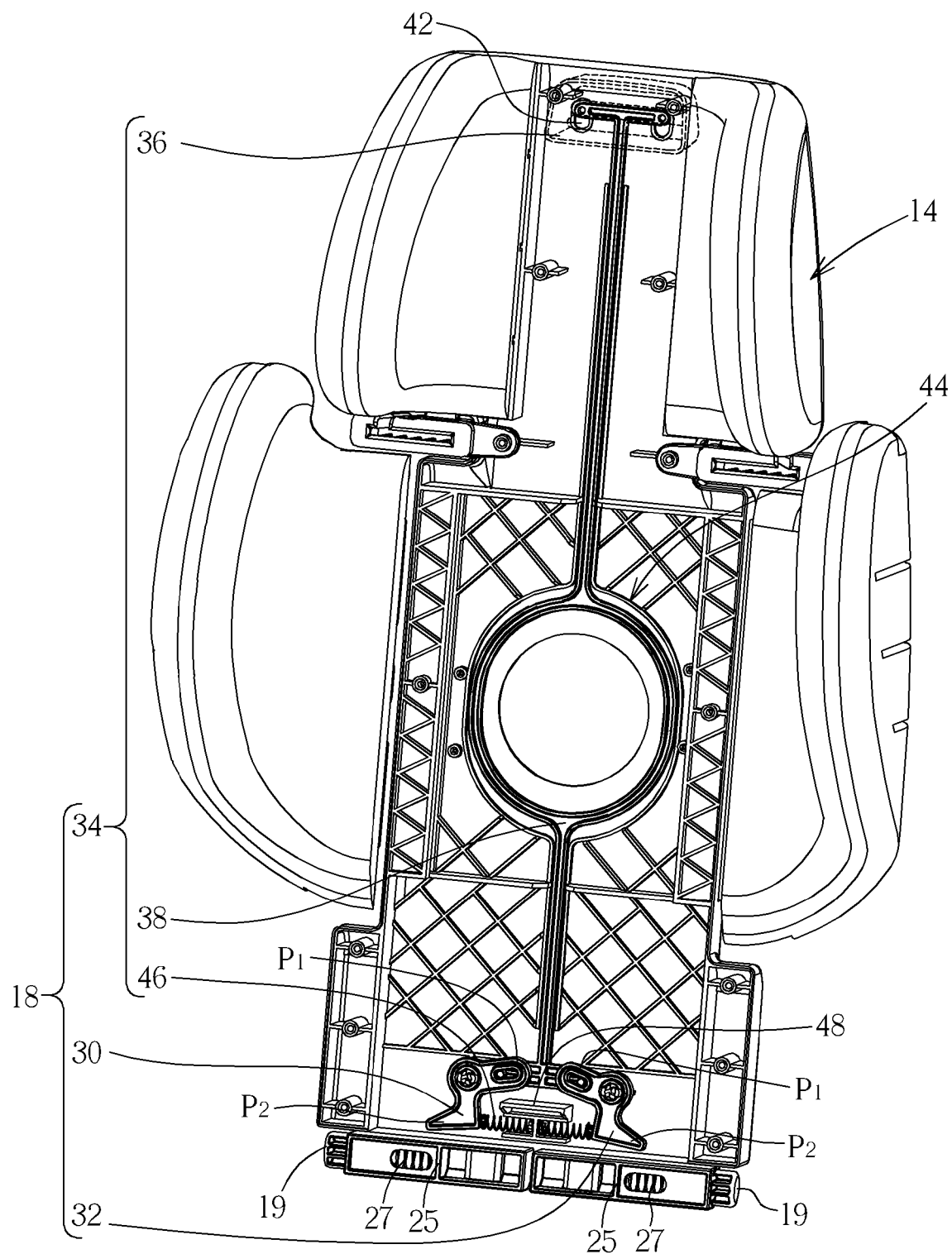
FIG. 6 is a schematic diagram illustrating the driving device, which is shown in FIG. 4, moving to a releasing position relative to the backrest
Figure 7:
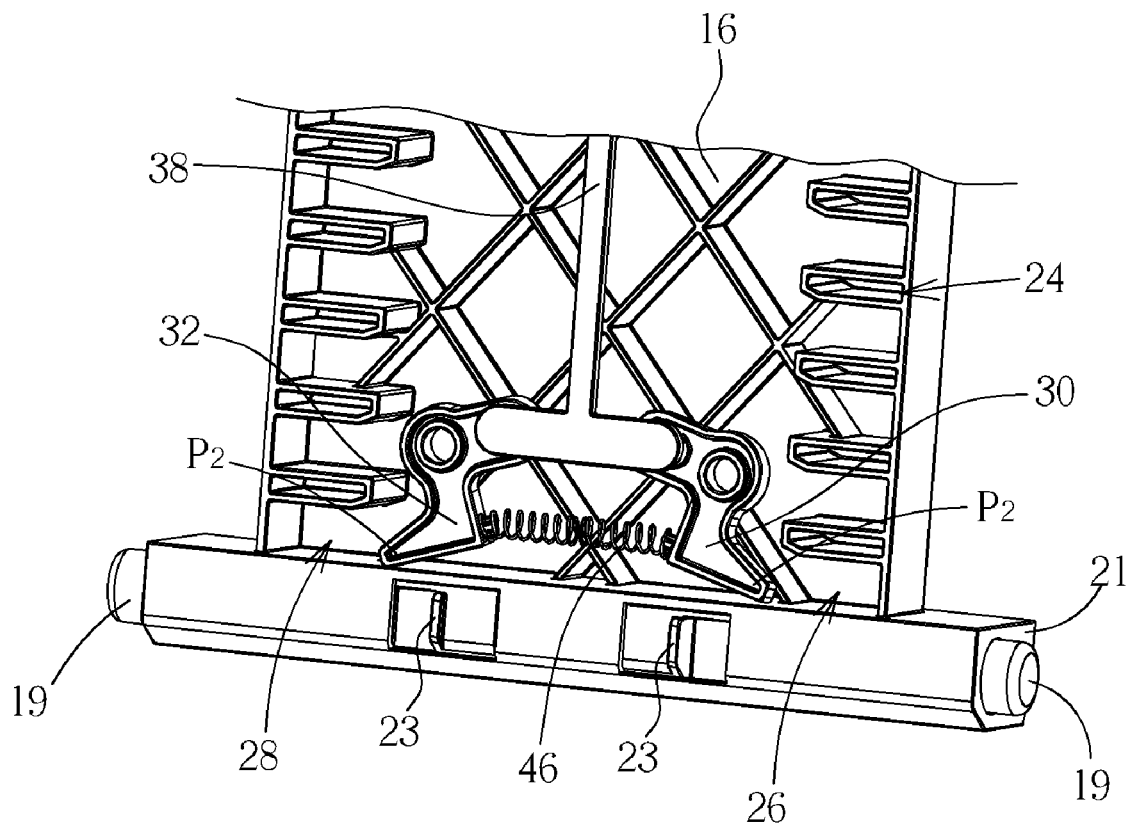
FIG. 7 is an enlarged view illustrating the first and second engaging members, which are shown in FIG. 5, disengaged from the tooth-shaped structure.

Referring to FIGS. 6 and 7, FIG. 6 is a schematic diagram illustrating the driving device 34, which is shown in FIG. 4, moving to a releasing position relative to the backrest 14, and FIG. 7 is an enlarged view illustrating the first and second engaging members 30 and 32, which are shown in FIG. 5, disengaged from the tooth-shaped structure 24. When a user wants to adjust the height of the backrest 14 relative to the engaging board 16 in compliance with the height of the child secured on the child safety seat 10, he or she only has to pull the pulling member 36 of the driving device 34 upwardly from a bottom position of the restraining hole 42 (shown in FIG. 4) to a top position of the restraining hole 42 (shown in FIG. 6), so as to drive the driving device 34 to move relative to the backrest 14 from the locking position (shown in FIG. 4) to the releasing position (shown in FIG. 6). At this time, the connecting member 38, which is connected to the pulling member 36, will move upwardly and then drive the first end P1 of the first engaging member 30 and the first end P1 of the second engaging member 32 to rotate relative to the backrest 14. Therefore, as shown in FIG. 7, due to the rotation of the first and second engaging members 30 and 32, the second end P2 of the first engaging member 30 and the second end P2 of the second engaging member 32 are respectively disengaged from the first and second positioning grooves 26 and 28 of the tooth-shaped structure 24. At this time, the spring 46 is compressed. Accordingly, since the second end P2 of the first engaging member 30 and the second end P2 of the second engaging member 32 have been respectively disengaged from the first and second positioning grooves 26 and 28 of the tooth-shaped structure 24, the backrest 14 can move relative to the engaging board 16 upwardly and downwardly. After the user pulls the pulling member 36 of the driving device 34 upwardly to the top position of the restraining hole 42, the pillar 40 of the pulling member 36 abuts against the restraining hole 42 of the backrest 14. Thus, the user can operate the pulling member 36 to drive the backrest 14 to move relative to the engaging board 16 to a desired height in compliance with the height of the child secured on the child safety seat 10.

For example, when the backrest 14 moves to the position (shown in FIG. 8) relative to the engaging board 16 from a former position (such as shown in FIG. 7), the first and second engaging members 30 and 32 also move to align with another first and second positioning grooves 26 and 28 of the tooth-shaped structure 24. After releasing the pulling member 36, the compressed springs 46 provide elastic force for the first and second engaging members 30 and 32, so as to drive the first and second engaging members 30 and 32 to rotate relative to the backrest 14. Consequently, the driving device 34 will get back to the locking position automatically. During the aforesaid operation, due to the elastic force generated by the springs 46, the second end P2 of the first engaging member 30 and the second end P2 of the second engaging member 32 will rotate relative to the backrest 14 until the second end P2 of the first engaging member 30 and the second end P2 of the second engaging member 32 are respectively engaged with the first and second positioning grooves 26 and 28 of the tooth-shaped structure 24. Accordingly, through the engagement between the engaging mechanism 18 and the engaging board 16, the user can fix the backrest 14 at the height shown in FIG. 8 and then the operation of adjusting the height of the backrest 14 of the child safety seat 10 has been completed. Consequently, the child can lie on or lean against the backrest 14 with appropriate height comfortably.

Figure 8:
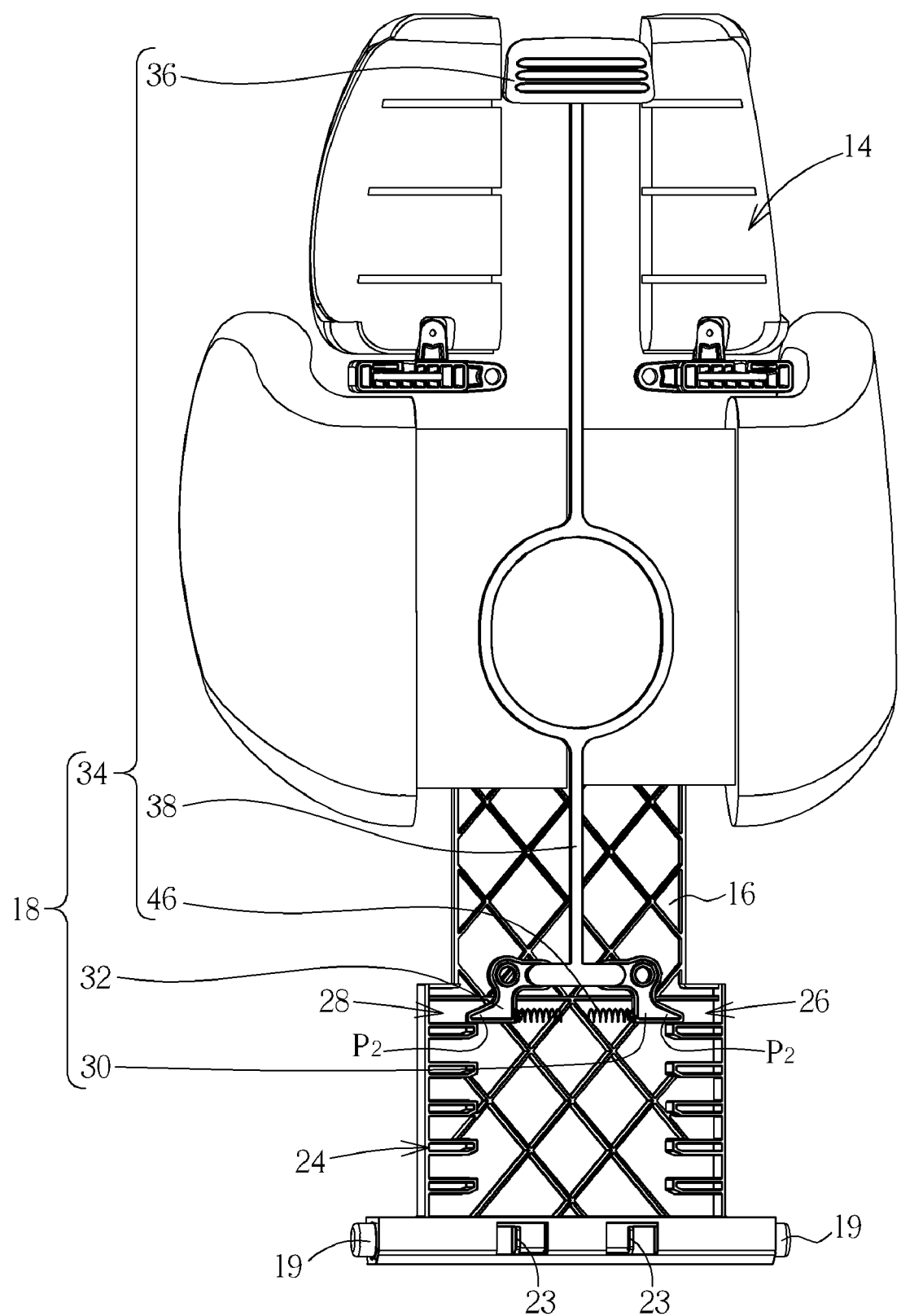
FIG. 8 is a schematic diagram illustrating the first and second engaging members, which are shown in FIG. 7, moving to other first and second positioning grooves relative to the engaging board.

Moreover, as shown in FIG. 5, the second ends P2 of the first and second engaging members 30 and 32 have inclined surfaces 50 formed thereon. When moving the backrest 14 upwardly and directly without operating the pulling member 36, the inclined surfaces 50 of the first and second engaging members 30 and 32 abut against side walls of the first and second positioning grooves 26 and 28 respectively and then rotate correspondingly, so as to disengage the first and second engaging members 30 and 32 from the first and second positioning grooves 26 and 28 respectively. Accordingly, the backrest 14 can move upwardly for purpose of height adjustment. Since the springs 46 are compressed by the rotation of the engaging members 30 and 32, then provide elastic force after being released to enforce the first and second engaging members 30 and 32 be engaged with other positioning grooves after the engaging members 30 and 32 are disengaged from the side walls of the first and second positioning grooves 26 and 28. Consequently, the backrest 14 can be fixed at a desired position. In addition, as shown in FIG. 8, since there are six positioning grooves formed on each of both sides of the tooth-shaped structure 24, the backrest 14 of the child safety seat 10 can be adjusted in six different positions. It should be noted that the number of the positioning grooves formed on the tooth-shaped structure 24 can be determined based on practical applications and manufacturing requirements of the child safety seat 10.

If the user wants to adjust the height of the backrest 14 relative to the engaging board 16 again, he or she only has to pull the pulling member 36 of the driving device 34 again and repeats the aforesaid operation, so as to drive the first and second engaging members 30 and 32 of the engaging mechanism 18 to rotate relative to the backrest 14 and then disengage from the tooth-shaped structure 24. Then, the user can pull the backrest 14 to move relative to the engaging board 16 upwardly and downwardly. Accordingly, the user can move the backrest 14 to a desired height relative to the engaging board 16 in compliance with the height of the child secured on the child safety seat 10. Since the back of the child can be supported well, the child can lie on or lean against the backrest 14 comfortably.

Still further, the user can operate the protruding shaft 19 of the engaging board 16 to disengage the seat body 12 from the engaging board 16 or the backrest 14. When the engaging board 16 is pivotally connected to the seat body 12 and the user wants to disengage the backrest 14 from the seat body 12, he or she only has to press the press portions 23 of the protruding shafts 19 simultaneously to retract the protruding shafts 19 toward the center of the engaging board 16. At this time, the engaging board 16 can be disconnected from the seat body 12, such that the seat body 12 can be disengaged from the engaging board 16 or the backrest 14. On the other hand, when the user wants to attach the engaging board 16 or the backrest 14 to the seat body 12, he or she has to press the press portions 23 to retract the protruding shafts 19 into the engaging board 16. At this time, the resilient members 27 are compressed between protruding shafts 19 and partitions 25. Afterward, the user has to align the protruding shafts 19 and the corresponding concave holes of the seat body 12 and then release the press portions 23, such that the protruding shafts 19 will protrude from the engaging board 16 due to the elastic force generated by the resilient members 27 and then engage with the seat body 12. Consequently, the engaging board 16 or the backrest 14 is connected to the seat body 12 again.

Compared to the prior art, the child safety seat of the invention utilizes the aforesaid driving device to engage/disengage the engaging member with/from the tooth-shaped structure of the engaging board, so as to enable the backrest to move relative to the engaging board upwardly and downwardly or fix at specific height relative to the engaging board. Accordingly, through simple design of engaging mechanism, the invention not only simplifies the structure of height adjusting mechanism but also reduces the manufacture cost. Furthermore, a user can easily adjust height of the backrest relative to the engaging board through simple operation, so as to greatly enhance the convenience while using the child safety seat.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
 a seat body;
 an engaging board connected to the seat body, a tooth-shaped structure being formed on the engaging board;
 a backrest movably disposed on the engaging board; and
 an engaging mechanism disposed between the engaging board and the backrest, the engaging mechanism comprising:
  an engaging member pivotally connected to the backrest for engaging with the tooth-shaped structure; and
  a driving device movably connected to the backrest, the driving device comprising:
   a connecting member pivotally connected to a first end of the engaging member; and
   a pulling member connected to the connecting member, for driving the first end of the engaging member to rotate relative to the backrest when the driving device moves to a releasing position, so as to disengage a second end of the engaging member from the tooth-shaped structure, and further for driving the first end of the engaging member to rotate relative to the backrest when the driving device moves to a locking position, so as to engage the second end of the engaging member with a positioning groove of the tooth-shaped structure, such that a height of the backrest relative to the engaging board is fixed;

wherein the backrest is capable of moving relative to the engaging board when the second end of the engaging member is disengaged from the tooth-shaped structure.

2. The child safety seat of claim 1, wherein the second end of the engaging member has an inclined surface.

3. The child safety seat of claim 1, wherein the pulling member comprises a pillar disposed in a restraining hole of the backrest.

4. The child safety seat of claim 1, wherein the driving device further comprises a spring connected between the engaging member and a protruding portion of the backrest.

5. The child safety seat of claim 1, wherein the pulling member is a handle.

6. The child safety seat of claim 1, wherein the backrest comprises a headrest portion and a body portion, the headrest portion and the body portion are formed integrally and movable synchronously disposed on the engaging board.

7. The child safety seat of claim 1, wherein an accommodating space is formed on the backrest and used for accommodating the connecting member.

8. The child safety seat of claim 1, further comprising a backrest cover, disposed on one side of the engaging board, for covering the engaging board and the engaging mechanism.

9. The child safety seat of claim 8, further comprising a protecting pad disposed on the backrest cover.

10. The child safety seat of claim 9, wherein the protecting pad is made of expandable polystyrene (EPS).

11. The child safety seat of claim 1, further comprising a protruding shaft extending outwardly from one side of the engaging board, wherein the engaging board is pivotally connected to the seat body by the protruding shaft.

12. The child safety seat of claim 11, further comprising a resilient member disposed between the protruding shaft and the engaging board.

13. The child safety seat of claim 11, wherein the protruding shaft is capable of moving relative to the engaging board.

* * * * *